United States Patent [19]

Antonucci

[11] Patent Number: 5,108,243
[45] Date of Patent: Apr. 28, 1992

[54] PLASTIC FOLDABLE SPACER TO BE USED IN CONJUNCTION WITH ELECTRICAL BOXES

[76] Inventor: Mark Antonucci, 2520- 5th St., No. A, Santa Monica, Calif. 90405

[21] Appl. No.: 640,932

[22] Filed: Jan. 14, 1991

[51] Int. Cl.$^5$ .......................... F16B 43/02; H02G 3/08
[52] U.S. Cl. ................................. 411/547; 411/535; 200/3.7; 439/539
[58] Field of Search ............... 411/524, 535, 536, 544, 411/546, 547; 439/539, 569; 220/3.3–3.8

[56] References Cited

U.S. PATENT DOCUMENTS

| | | | |
|---|---|---|---|
| 2,205,626 | 6/1940 | Mason | D2/631 X |
| 4,437,784 | 3/1984 | Peterson | 411/547 |
| 4,909,692 | 3/1990 | Hendren | 411/544 |
| 4,948,317 | 8/1990 | Marinaro | 411/547 |

FOREIGN PATENT DOCUMENTS 119738 10/1918 United Kingdom ............... 411/544

Primary Examiner—Neill R. Wilson
Attorney, Agent, or Firm—Thomas I. Rozsa

[57] ABSTRACT

A spacing apparatus to be used in conjunction with electrical wiring boxes, comprising an elongated thin foldable strip approximatelly 1" in width and 6" in length which further comprises a multiplicity of rectangular shaped equal sized sections each having a round central hole, whereby a certain number of the multiplicity of sections can be folded together to form a rectangular shaped corrugated spacer with a desired thickness to fill the gap between the screw arms of the electrical wiring devices and a round central hole to accommodate the fastening screw.

7 Claims, 1 Drawing Sheet

U.S. Patent                Apr. 28, 1992                5,108,243
Fig. 1.
Fig. 2.
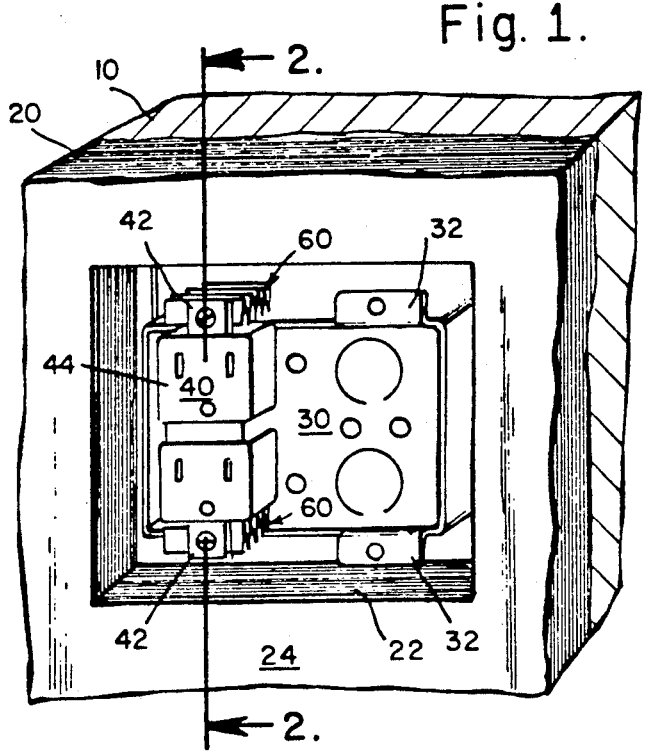
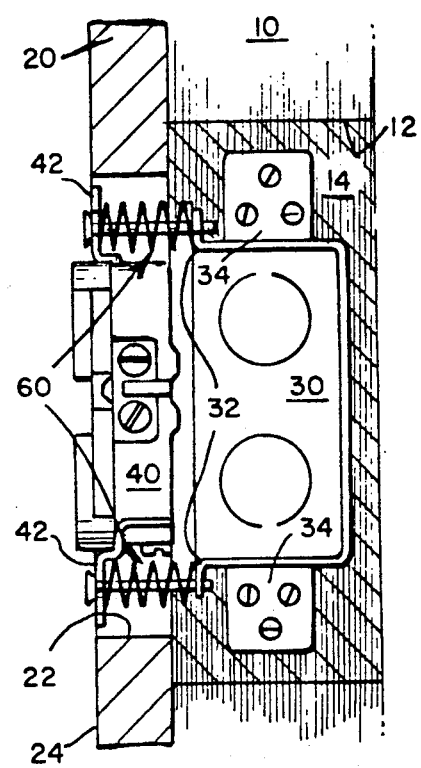
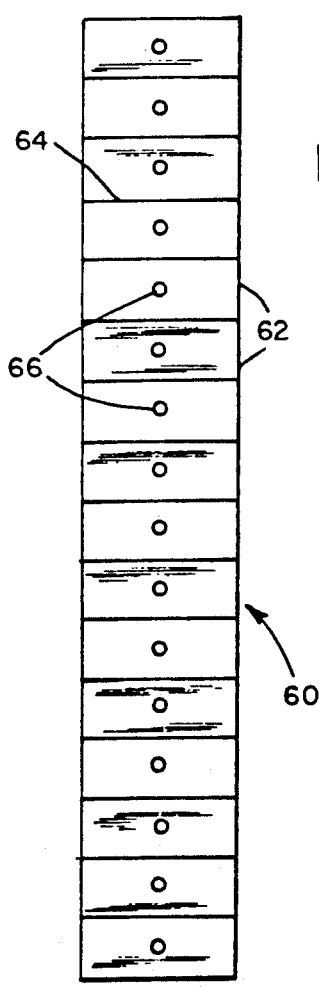
Fig. 3.
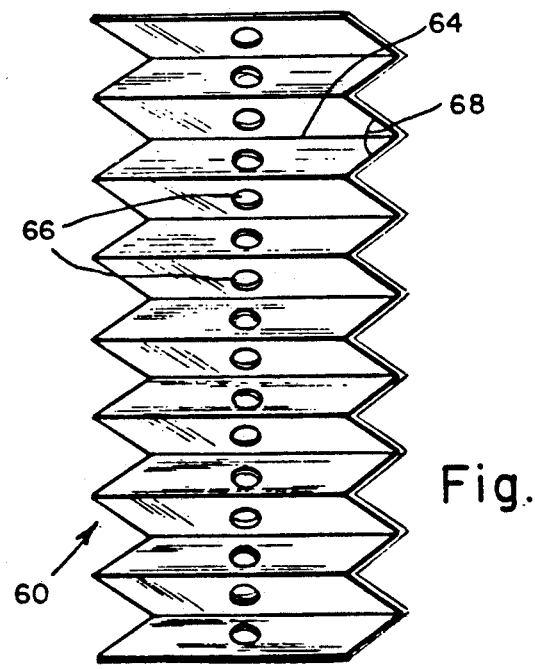
Fig. 4.

PLASTIC FOLDABLE SPACER TO BE USED IN CONJUNCTION WITH ELECTRICAL BOXES

BACKGROUND OF THE INVENTION

1. Field of the Invention

The present invention relates to the field of electrical wiring installations. More particularly the present invention relates to the field of spacing means used in conjunction with electrical wiring boxes and screw fastening means.

2. Description of The Prior Art

When installing indoor electrical switch and outlet plates on the walls, electrical wiring boxes are often placed inside the walls behind the electrical plates. Electrical wiring boxes are usually square shaped metal box frames with various openings and holes for mounting with screws and running electrical wires.

Today the dividing walls in homes and offices typically have a hard central portion and a surface portion. The hard central portion is the major part of a wall which stands the stress, and is what is ordinarily called the "wall". The surface portion, often called "dry wall", is the exposed part which is later placed as a covering onto the center portion of the wall for decoration and other purposes, and is usually made of tile or similar light material. In the following discussion if not otherwise specified, the word "wall" is used to specify the central portion of a wall, and the word "dry wall" is used to specify the surface portion of a wall.

Referring to FIGS. 1 and 2, in the practice of indoor electrical installations, first a square shaped chamber 12 is cut out from a wall 10. The size of chamber 12 is usually greater than the size of commercial electrical wiring boxes. An electrical wiring box 30 is then placed into chamber 12. Electrical box 30 often has receiving arms 32 and mounting arms 31 with screw holes. Mounting arms 34 can be fastened to an edge 14 of chamber 12 by using fastening screws to tightly mount electrical box 30 to wall 10. After electrical box 30 is installed into wall 10, a dry wall 20 is placed over wall 10, and an opening 22 is cut out at the position of electrical box 30 for installing electrical wall plates such as electrical switch plates or power outlet plates. FIG. 1 shows an example of an electrical power outlet plate 40. Usually electrical plate 40 has mounting arms 42 with screw holes. If there is no dry wall 20, mounting arms 42 of electrical plate 40 may be directly brought into contact with receiving arms 32 of electrical box 30 and fastened by screws. However it becomes difficult to mount the power outlet plate 40 since dry wall 20 has a certain thickness. The exposed surface 44 of electrical plate 40 is supposed to be in the same plane with the exposed surface 24 of dry wall 20, or even further extends out a little bit, which leaves a gap between a mounting arm 42 of electrical plate 40 and a respective receiving arm 32 of electrical box 30, as shown in FIG. 2. If opening 22 of dry wall 20 is cut right in size, mounting arms 42 of electrical plate 40 can probably be mounted by screws directly to exposed surface 24 of dry wall 20 near the edge of opening 22. Unfortunately, sometimes opening 22 is made too large which makes it impossible to mount mounting arm 42 of electrical plate 40 directly onto exposed surface 24 of dry wall 20. Therefore mounting arms 42 of electrical plate 40 have to be screwed to receiving arms 32 of electrical box 30, even if there is a gap in between.

In the prior art, electricians either wrap a lot of wire around the screws or, alternatively, use other shims such as rings of washers to provide means with a certain thickness to fill the gap. These conventional approaches are both inconvenient and unstable. It will be very beneficial if there is a spacer means that can be easily applied in this situation.

SUMMARY OF THE PRESENT INVENTION

The present invention is a plastic foldable spacer to be used in conjunction with electrical boxes.

It is known that when installing electrical plates such as switch plates or power outlet plates with electrical wiring boxes, it is often found that the mounting arms of the electrical plates need to be screwed onto the receiving arms of the electrical boxes but there is a gap in between. Traditionally people use whatever is available to fill the gap, such as a multiple winding of wires or rings of washers, which is often inconvenient and unstable.

It has been discovered, according to the present invention, that if an elongated strip of a certain thickness comprises a series of foldable sections, then the elongated strip can be folded into a corrugated spacer which has the thickness of multiple sections but the size of a single section, and in turn can be used to fill the gap between two corresponding screw arms of the electrical wiring devices.

It has further been discovered, according to the present invention, that if each of the sections of the foldable strip has a screw hole at the center, then the resultant corrugated spacer will have a central screw hole. Therefore when used to fill the gap, it allows a screw to go through to fasten the mounting arms.

It has also been discovered, according to the present invention, that if the foldable strip is made of thin sheet of plastic material, then it will provide the desired flexibility with enough strength and insulation to be used with electricity It is therefore an object of the present invention to provide an elongated strip which be cut to any desired thickness comprising a series of foldable sections, so that the elongated strip can be folded into a corrugated spacer which has the thickness of multiple sections but the size of a single section, and in turn can be used to fill the gap between two corresponding mounting arms of the electrical wiring devices.

It is a further object of the present invention to provide a foldable strip with a series of sections, each having a screw hole at the center, so that the resultant corrugated spacer will have a central screw hole and when used to fill the gap, will allow a screw to go through to fasten the mounting arms.

It is also an object of the present invention to provide a foldable strip made of thin sheets of plastic material, so that it will provide the desired flexibility with enough strength and insulation to be used with electricity.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a schematic diagram showing an electrical outlet installation on a wall.

FIG. 2 is a cross-sectional view taken along line 2—2 of FIG. 1.

FIG. 3 is a schematic diagram of the present invention before it is folded for use as a spacer.

FIG. 4 is a schematic diagram of the present invention being folded for use as a spacer.

DETAILED DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 and 2, there is shown an electrical outlet installation. Electrical wiring box 30 is mounted in a chamber 12 cut out from wall 10. Dry wall 20 is placed over wall 10 after electrical box 30 is installed with opening 22 cut out at the position of electrical box 30 for installing electrical power outlet plate 40. Exposed surface 44 of electrical plate 40 is supposed to be leveled with exposed surface 24 of dry wall 20. Unfortunately opening 22 is cut too large which makes it impossible to mount mounting arm 42 of electrical plate 40 directly onto exposed surface 24 of dry wall 20, which means that mounting arms 42 of electrical plate 40 have to be screwed to receiving arms 32 of electrical box 30. However it becomes difficult to do so since dry wall 20 has a certain thickness, which leaves a gap between mounting arm 42 of electrical plate 40 and the respective receiving arm 32 of electrical box 30.

Referring to FIGS. 3 and 4, there is shown at 60 a preferred embodiment of the present invention. Elongated plastic strip 60 comprises a multiplicity of foldable sections 62, each having a pre-perforated screw hole 66 at the center, and can be folded along the dividing lines 64 between adjacent sections 62, to make a corrugated spacer 60 as shown in FIG. 4.

As shown in FIGS. 1 and 2, the resultant corrugated spacer has a thickness of multiple sections but the same small face area of a single section, therefore it can be used to fill the gap between mounting arm 42 of power outlet plate 40 and receiving arm 32 of wiring box 30. Since each foldable section 62 has a central screw hole 66, the resultant corrugated spacer 60 also has a central screw hole which allows screws to go through. With corrugated spacer 60 placed in between mounting arm 42 and receiving arm 32 as shown in FIGS. 1 and 2, mounting arm 42 of power outlet plate 40 can be tightly screwed to receiving arm 32 of wiring box 30, to securely mount power outlet plate 40 onto wiring box 30.

The present invention is very convenient to use. It may come in the form of an elongated strip of a certain number of sections. It may also come in the form of a wound roll such as a measuring tape, or other forms. In all cases, different numbers of sections can be cut and folded to fit the desired thickness. It is preferably made of a thin plastic sheet so it is flexible yet durable to use, and provides electrical insulation. The thin plastic is soft enough to be easily cut with a knife or scissors, yet will be strong enough to provide the resultant corrugated spacer with spring tension. This is necessary because for plastic material the folding along dividing lines 64 between adjacent sections 62 is not sharp but rather somewhat rounded, which makes the two adjacent sections 62 tend to form an angle 68, as shown in FIG. 4. This feature makes the thickness of corrugated spacer 60 capable of expanding too fill all the space between the screw arms of two electrical wiring devices, which in turn provides a much tighter fit.

By way of example only, the preferred embodiment of the present invention is a plastic strip being about 6" long and 1" wide. It comprises about 16 sections, each having a dimension of approximately $" to 7/16". The screw holes which are through the center of each section, are designed to accommodate a 6/32" screw which is commonly used in electrical wiring device installations. After being folded, the thickness of the resultant corrugated spacer will depend on how many sections have been cut from the elongated strip and folded. For an elongated strip with a thickness of approximately 1/64" to 1/32", 12 sections folded together will be approximately $" thick.

The sections of the elongated strip shown in FIG. 3 are rectangular with screw holes punctuated at the center. However, other shapes may be usable. Also, as long as the screw holes of different sections are aligned, they do not have to be at the center.

The present invention is especially useful when two or more electrical plates are to be mounted to the same electrical wiring box. A typical situation is when a power outlet plate and a manual switch plate are to be mounted to the same wiring box. It is very possible that there are different sized gaps between the screw arms of different devices, therefore spacers with various thicknesses are highly desirable. Strips with different numbers of sections can be cut from standard elongated strips and folded to make corrugated spacers with different thicknesses and each one can be specially accommodated to the specific thickness required at a special place. In addition to being used with dry wall installations, the present invention can also be used in a situation where a tile setter sets tile over an electrical wiring area where an additional thickening shim is necessary in order to provide the required thickness to fill the possible gap under the tile.

The present invention has many advantages, including (a) it is safe and convenient to be used in installations of electrical wiring boxes; (b) it is made of flexible plastic so it can be easily cut and folded to form a corrugated spacer with desired thickness; (c) it also has the strength to provide spring tension to the resultant corrugated spacer which in turn ensures a tight fit; and (d) it is easy and inexpensive to produce and maintain and it is durable.

Defined in detail, the present invention is a spacing apparatus to be used in conjunction with electrical wiring boxes, comprising an elongated thin foldable strip approximately 1" in width which further comprises sixteen rectangular shaped equal sized sections each having a round central hole approximately 3/16" in diameter, whereby a number of the sixteen sections can be folded together to form a rectangular shaped corrugated spacer with a desired thickness and a round central hole.

In one of the preferred embodiments of the present invention defined in detail, (a) the elongated thin foldable strip is made of plastic material; (b) the thickness of the elongated thin foldable strip is approximately between 1/64" and 1/32"; and (c) the length of each of the sixteen rectangular shaped equal sized sections is approximately ⅜" and 7/16 ".

Defined broadly, the present invention is a spacing apparatus to be used in conjunction with electrical wiring boxes, comprising an elongated thin foldable strip which further comprises a multiplicity of equal sized sections each having at least one central opening, whereby a certain number of the multiplicity of sections can be folded together to form a corrugated spacer with a desired thickness and at least one central opening.

Defined more broadly, the present invention is a spacing apparatus to be used in conjunction with electrical wiring boxes, comprising at least one foldable strip which further comprises at least two sections each having at least one opening whereby the at least two sections can be folded together to form a corrugated spacer wherein the corresponding openings of the at least two sections are aligned.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A spacing apparatus to be used in conjunction with electrical wiring boxes, comprising an elongated and unfolded thin foldable strip approximately 1" in width which further comprises sixteen rectangular shaped equal sized sections connected directly along their adjacent edges, each section having a round central hole approximately 3/16" in diameter, whereby a certain number of said sixteen sections can be cut off from said unfolded strip and folded together to form a rectangular shaped corrugated spacer with a desired thickness and a round central hole.

2. The invention as defined in claim 1 wherein said elongated and unfolded thin foldable strip is made of plastic material.

3. The invention as defined in claim 1 wherein the thickness of said elongated and unfolded thin foldable strip is approximately between 1/64" and 1/32".

4. The invention as defined in claim 1 wherein the length of each of said sixteen rectangular shaped equal sized sections is approximately between ⅜" and 7/16".

5. A spacing apparatus to be used in conjunction with electrical wiring boxes, comprising an elongated and unfolded thin foldable strip which further comprises a multiplicity of equal sized sections connected directly along their adjacent edges, each having at least one central opening, where each said equal sized section being substantially flat and stiff but said strip is foldable at said adjacent edges of said sections, and said strip is made of a memory retaining material such that once a certain number of the multiplicity of sections are cut off from said unfolded strip and folded together to form a corrugated spacer with a desired thickness and at least one central opening, said corrugated spacer will remain in the folded and corrugated configuration.

6. The invention as defined in claim 5 wherein said elongated and unfolded thin foldable strip is made of plastic material.

7. The invention as defined in claim 5 wherein the length of said elongated and unfolded thin foldable strip is approximately 6".

* * * * *